US008750152B2

(12) United States Patent
Koo et al.

(10) Patent No.: US 8,750,152 B2
(45) Date of Patent: Jun. 10, 2014

(54) METHOD FOR TRANSMITTING COMP FEEDBACK INFORMATION IN WIRELESS COMMUNICATION SYSTEM AND TERMINAL APPARATUS

(75) Inventors: Ja Ho Koo, Anyang-si (KR); Ki Jun Kim, Anyang-si (KR); Han Byul Seo, Anyang-si (KR); Hyung Tae Kim, Anyang-si (KR); Bin Chul Ihm, Anyang-si (KR); Jae Hoon Chung, Anyang-si (KR)

(73) Assignee: LG Electronics Inc., Seoul (KR)

( * ) Notice: Subject to any disclaimer, the term of this patent is extended or adjusted under 35 U.S.C. 154(b) by 120 days.

(21) Appl. No.: 13/499,645

(22) PCT Filed: Sep. 30, 2010

(86) PCT No.: PCT/KR2010/006676
§ 371 (c)(1),
(2), (4) Date: Mar. 30, 2012

(87) PCT Pub. No.: WO2011/040773
PCT Pub. Date: Apr. 7, 2011

(65) Prior Publication Data
US 2012/0188904 A1    Jul. 26, 2012

Related U.S. Application Data

(60) Provisional application No. 61/246,983, filed on Sep. 30, 2009.

(30) Foreign Application Priority Data

Dec. 9, 2009 (KR) .......................... 10-2009-0121790

(51) Int. Cl.
*H04W 24/00* (2009.01)

(52) U.S. Cl.
USPC ............................................ 370/252; 370/328

(58) Field of Classification Search
USPC .......... 370/254, 331, 329, 336, 252; 455/501, 455/452.1, 450, 517; 375/260
See application file for complete search history.

(56) References Cited

U.S. PATENT DOCUMENTS

| 8,427,978 | B2 * | 4/2013 | Xiao | 370/254 |
|---|---|---|---|---|
| 2009/0264142 | A1 * | 10/2009 | Sankar et al. | 455/501 |
| 2010/0056171 | A1 * | 3/2010 | Ramprashad et al. | 455/452.1 |
| 2010/0173660 | A1 * | 7/2010 | Liu et al. | 455/501 |
| 2010/0273514 | A1 * | 10/2010 | Koo et al. | 455/501 |
| 2010/0303039 | A1 * | 12/2010 | Zhang et al. | 370/331 |
| 2010/0317355 | A1 * | 12/2010 | Zangi et al. | 455/450 |
| 2011/0013710 | A1 * | 1/2011 | Xiao | 375/260 |

(Continued)

OTHER PUBLICATIONS

Samsung, "CoMP implicit CQU feedback discussions", 3GPP TSG RAN WG1 #57bis, R1-092654, Jun. 29-Jul. 3, 2009.

(Continued)

*Primary Examiner* — Asad Nawaz
*Assistant Examiner* — Parth Patel
(74) *Attorney, Agent, or Firm* — McKenna Long & Aldridge LLP

(57) ABSTRACT

Disclosed are a method for transmitting CoMP feedback information in a wireless communication system and a terminal apparatus using the same. Measured values of adjacent cells for performing a CoMP operation can be generated by using measured values defined in an existing LTE system. Consequently, the present invention doesn't need to define new measured values in a LTE-Advanced system.

10 Claims, 5 Drawing Sheets

(56) References Cited

U.S. PATENT DOCUMENTS

2011/0051826 A1* 3/2011 Jung et al. .................. 375/260
2011/0292903 A1* 12/2011 Jongren et al. ............... 370/329
2012/0202541 A1* 8/2012 Koo et al. .................... 455/501
2012/0282966 A1* 11/2012 Koo et al. .................... 455/517
2012/0320882 A1* 12/2012 Sankar et al. ................ 370/336
2013/0083681 A1* 4/2013 Ebrahimi Tazeh Mahalleh
et al. .......................... 370/252

OTHER PUBLICATIONS

Alcatel-Lucent, "Comparison of CSI Feedback Schemes", 3GPP TSG RAN WG1 #57bis, R1-092310, Jun. 29-Jul. 3, 2009.

Etri, "UE feedback for downlink CoMP", 3GPP TSG RAN WG1 #57bis, R1-092304, Jun. 29-Jul. 3, 2009.

Etri, "Multi-cell PMI coordination for downlink CoMP", 3GPP TSG RAN WG1 #57bis, R1-092303, Jun. 29-Jul. 3, 2009.

* cited by examiner

METHOD FOR TRANSMITTING COMP FEEDBACK INFORMATION IN WIRELESS COMMUNICATION SYSTEM AND TERMINAL APPARATUS

This application is a 35 U.S.C. §371 National Stage entry of International Application No. PCT/KR2010/006676, filed on Sep. 30, 2010, and claims the benefit of priority of U.S. Provisional Application No. 61/246,983 filed Sep. 30, 2009 and Korean Patent Application No. 10-2009-0121790 filed on Dec. 9, 2009, both of which are incorporated by reference in their entirety herein.

FIELD OF THE INVENTION

The present invention relates to a wireless communication system and, more particularly, to a method for generating and transmitting feedback information for performing CoMP operations.

BACKGROUND ART

In order to meet with the requirements of LTE-Advanced systems and to enhance the performance of the conventional systems, a series of new techniques, such as relay, carrier aggregation, and CoMP (Coordinated Multi-Point) transmission and reception have been proposed. Among the newly proposed techniques, the CoMP (generally referred to as Co-MIMO, collaborative MIMO, network MIMO, etc.) is being highly appraised as a technique that can enhance communication performance of a cell boundary user equipment and increase a throughput of a sector. Generally, in an multiple cell environment, wherein a frequency re-usage rate is equal to 1, inter-cell interference may degrade the performance of the user equipments and may also decrease the throughput of the corresponding sector. A simple manual method for reducing the inter-cell interference (i.e., an FFR (Fractional Frequency Reuse) method of a user equipment (UE)-specific power control) is applied in the LTE systems in order to enhance the throughput of a cell boundary user equipment within an interference-limited environment. Instead of reducing the usage of frequency resource in each cell, it is more preferable to reduce inter-cell interference by re-using inter-cell interference by means of a desirable signal. In order to achieve this object, a plurality of CoMP (Coordinated Multi-Point) methods has been proposed. Hereinafter, a CoMP system will hereinafter be described briefly.

A CoMP system refers to a system for enhancing the throughput of a user located within a cell boundary by applying an enhanced MIMO (Multiple-Input Multiple-Output) transmission in a multiple cell environment. By adopting the CoMP system, the Inter-Cell Interference within a multiple cell environment may be reduced. By using such CoMP system, a user equipment may be commonly supported with data from a Multi-cell base station.

Also, by simultaneously supporting one or more user equipments (UE 1, UE 2, . . . UE K) using the same radio frequency resource, each base station may enhance the system performance. Also, based upon channel state information (CSI) between the base station and the user equipments, the base station may perform an SDMA (Space Division Multiple Access) method.

The above-described CoMP method may be divided into a JP (Joint Processing) method of a coordinated MIMO (Co-MIMO) format via data sharing and a CS/CB (Coordinated Scheduling scheme/Beamforming scheme).

FIG. 1 illustrates a conceptual view of CoMP operations of an intra base station (intra eNB) and an inter base station (inter eNB).

Referring to FIG. 1, intra base stations (110, 120) and an inter base station (130) exist in a Multi Cell environment. In an LTE (Long Term Evolution), an intra base station is configured of several cells (or sectors). Cells belonging to a base station, to which a specific user equipment belongs, are related with the specific user equipment and the intra base stations (110, 120). More specifically, cells sharing the same base station as the user equipments belonging to the cells are referred to as the cells corresponding to the intra base stations (110, 120), and the cells belonging to other base stations may be referred to as cells corresponding to the inter base station (130). As described above, although cells that are based upon the same base station as the specific user equipment transmit and receive information (e.g., data, CSI (Channel State Information)) to and from one another through an x2 interface, cells that are based upon another base station may transmit and receive inter-cell information to and from one another via Backhaul (140).

As shown in FIG. 1, a single-cell MIMO user (150) located within a single cell may communicate with a single serving base station within a single cell (sector), and a multi-cell MIMO user (160) located at a cell boundary may communicate with multiple serving base stations within multiple cells (sectors).

In order to perform such CoMP operations, the user equipment is required to feed-back the CSI to the serving base station. Among the CSI, PMI, RI may be used in all CoMP operation methods, and PMI, RI formats may be used in all CoMP operation methods. However, among the CSI within an LTE system, it may be difficult to apply the format of the CQI in all CoMP operation methods without any modification. Therefore, as a new measurement is required to be performed in order to allow the user equipment to feed-back CQI values of neighboring cells, which perform CoMP operations, a problem of having a large overhead with respect to the measurement may occur.

DETAILED DESCRIPTION OF THE INVENTION

Technical Objects

The technical object which the present invention seeks to achieve is to provide a method of a user equipment performing CoMP operations for transmitting feedback information in a wireless communication system.

Another technical object of the present invention is to provide a user equipment device for transmitting feedback information in order to perform CoMP operations in a wireless communication system.

Another technical object of the present invention is to provide a method of a base station performing CoMP operations for generating channel state information values in a wireless communication system.

A further technical object of the present invention is to provide a base station for generating channel state information in order to perform CoMP operations in a wireless communication system.

The technical objects of the present invention will not be limited only to the objects described above. Accordingly, additional technical objects of the present application will be set forth in part in the description which follows and in part will become apparent to those having ordinary skill in the art upon examination of the following or may be learned from practice of the present application.

Technical Solutions

In order to achieve the technical object of the present invention, a method for transmitting CoMP feedback information includes the steps of measuring an intensity or interference level of a signal of each cell performing the CoMP operations, by using a reference signal received from the each cell, and a sum of signal intensity or a sum of interference levels of remaining neighboring cells excluding a serving cell, among the cell performing the CoMP operations, and cell that does not perform the CoMP operations; generating channel quality information respective to each cell performing the CoMP operations, by using, the measured intensity or interference levels values of the signals corresponding to each cell performing the CoMP operations, an average value of the measured sum of the signal intensity or interference level values of each cell that odes not perform the CoMP operations, the average value of the measured sum being accumulated for a predetermined time period; and transmitting the generated channel quality information to a serving base station.

In order to achieve another technical object of the present invention, a user equipment (UE) apparatus for transmitting CoMP feedback information includes a measurement module configured to measure an intensity or interference level of a signal of each cell performing the CoMP operations, by using a reference signal received from the each cell, and a sum of signal intensity or a sum of interference levels of remaining neighboring cells excluding a serving cell, among the cell performing the CoMP operations, and cell that does not perform the CoMP operations; a generation module configured to generate channel quality information respective to each cell performing the CoMP operations, by using, the measured intensity or interference levels values of the signals corresponding to each cell performing the CoMP operations, and an average value of the measured sum of the signal intensity or interference level values of each cell that does not perform the CoMP operations, the average value of the measured sum being accumulated for a predetermined time period.

In order to achieve yet another technical object of the present invention, a method for generating Channel Quality Information values at a base station (BS) performing CoMP (Coordinated Multi-Point) operations in a wireless communication system includes the steps of receiving a channel quality information value respective to each cell performing the CoMP operations from a user equipment; and generating at least one or more channel quality information values, among a channel quality information value corresponding to a first CoMP operation scheme and a channel quality information value corresponding to a second CoMP operation method, by using the received channel quality information value respective to each cell. Herein, the received channel quality information may be generated by using, the measured intensity or interference levels values of the signals corresponding to each cell performing the CoMP operations, and an average value of sum of the signal intensity or interference level values of each cell that does not perform the CoMP operations, the average value of sum being accumulated for a predetermined time period.

In order to achieve a further technical object of the present invention, a base station (BS) apparatus for generating Channel Quality Information values includes a reception module configured to receive a channel quality information value respective to each cell performing the CoMP operations from a user equipment; and a generation module configured to generate at least one channel quality information value, among a channel quality information value corresponding to a first CoMP operation scheme and a channel quality information value corresponding to a second CoMP operation scheme, by using the received channel quality information value respective to each cell. Herein, the received channel quality information may be generated by using, the measured intensity or interference levels values of the signals corresponding to each cell performing the CoMP operations, an average value of sum of the signal intensity or interference level values of each cell that does not perform the CoMP operations, the average value of sum being accumulated for a predetermined time period.

Effects of the Invention

According to the present invention, by generating and transmitting CQI values respective to neighboring cells, which perform CoMP operations, using a CQI value of a serving cell, based upon conventional single-cell operations, a more efficient feedback information transmission may be available.

The effects that may be gained from the embodiment of the present invention will not be limited only to the effects described above. Accordingly, additional effects of the present application will be set forth in part in the description which follows and in part will become apparent to those having ordinary skill in the art upon examination of the following or may be learned from practice of the present application. More specifically, unintended effects obtained upon the practice of the present invention may also be derived by anyone having ordinary skill in the art.

BRIEF DESCRIPTION OF THE DRAWINGS

The accompanying drawings, which are included to provide a further understanding of the invention and are incorporated in and constitute a part of this application, illustrate embodiments of the invention and along with the description serve to explain the spirit and scope (or principle) of the invention.

BEST MODE FOR CARRYING OUT THE PRESENT INVENTION

Figure 1:
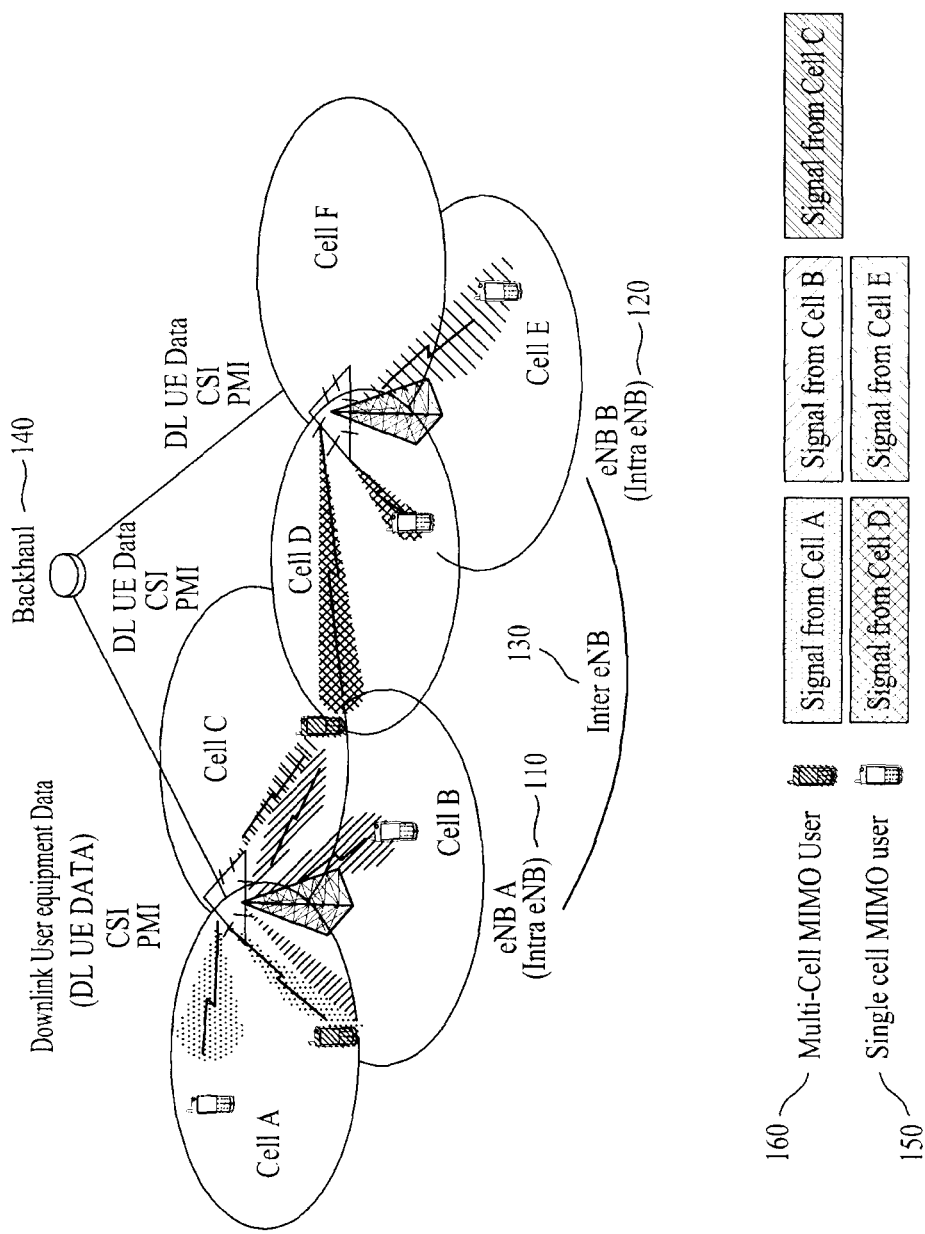
FIG. 1 illustrates a conceptual view of CoMP operations of an intra base station (intra eNB) and an inter base station (inter eNB)

Hereinafter, the preferred embodiments of the present invention will now be described in detail with reference to the accompanying drawings. The detailed description of the present invention that is to be disclosed along with the appended drawings is merely given to provide to describe the exemplary embodiment of the present invention. In other words, the embodiments presented in this specification do not correspond to the only embodiments that can be realized according to the present invention. In the following description of the present invention, the description of detailed features of the present invention will be given in order to provide a full and complete understanding of the present invention. However, it will be apparent to those skilled in the art that the present invention can be realized even without the detailed features described herein. For example, the present invention will be described in detail as follows based upon an assumption that the mobile communication system used in the present invention corresponds to a 3GPP LTE system. However, with the exception for the unique features of the 3GPP LTE system, other mobile communication systems may also be randomly applied in the present invention.

In some cases, in order to avoid any ambiguity in the concept (or idea) of the present invention, some of the structures and devices disclosed (or mentioned) in the present invention may be omitted from the accompanying drawings of the present invention, or the present invention may be illustrated in the form of a block view focusing only on the essential features or functions of each structure and device. Furthermore, throughout the entire description of the present invention, the same reference numerals will be used for the same elements of the present invention.

Furthermore, in the following description of the present invention, it is assumed that the user terminal (or user equipment) universally refers to a mobile or fixed user-end device, such as a UE (User Equipment), an MS (Mobile Station), and so on. Additionally, it is also assumed that the base station universally refers to as an arbitrary node of a network end, which communicates with the user equipment, such as a Node B, an eNode B, a Base Station, and so on.

In a mobile communication system, a user equipment may receive information from a base station via downlink, and the user equipment may also transmit information via uplink. The information received or transmitted by the user equipment includes data and diverse control information. And, various physical channels may exist depending upon the type and purpose of the information received or transmitted by the user equipment.

Figure 2:
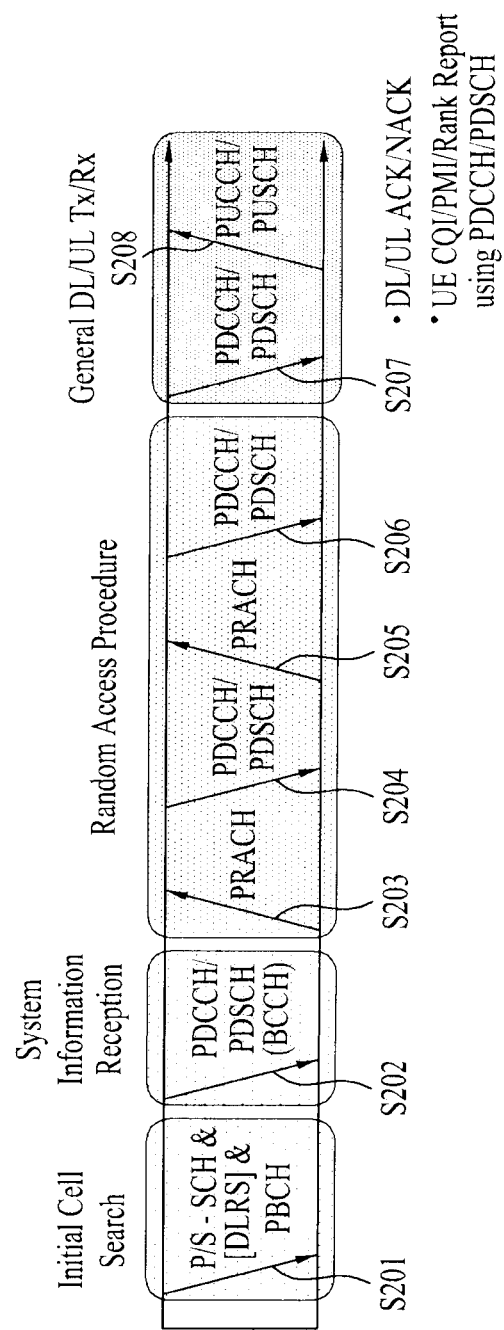
FIG. 2 illustrates physical channels that are used in a 3GPP (3rd Generation Partnership Project) LTE (Long Term Evolution) system, which corresponds to an example of a mobile communication system, and a general method for transmitting signals using such physical channels.

FIG. 2 illustrates physical channels that are used in a 3GPP (3rd Generation Partnership Project) LTE (Long Term Evolution) system, which corresponds to an example of a mobile communication system, and a general method for transmitting signals using such physical channels.

In step S201, the user equipment performs initial cell search such as synchronization with the base station, when the power is turned on from a power off state, or when it newly enters a cell. In order to do so, the user equipment synchronizes with the base station by receiving a P-SCH (Primary Synchronization Channel) and a S-SCH (Secondary Synchronization Channel) from the base station, and then acquires information such as a cell ID (Identifier), and so on. Thereafter, the user equipment may acquire broadcast information within the cell by receiving a Physical Broadcast Channel from the base station. Meanwhile, in the step of initial cell search, the user equipment may receive a DL RS (Downlink Reference Signal) so as to verify the downlink channel status.

In step S202, once the user equipment has completed the initial cell search, the corresponding user equipment may acquire more detailed system information by receiving a PDCCH (Physical Downlink Control Channel) and a PDSCH (Physical Downlink Control Channel) respective to the respective Physical Downlink Control Channel information.

Meanwhile, if the user equipment initially accesses the base station, or if there are no radio resources for signal transmission, the user equipment may perform a Random Access Procedure, such as in step S203 to step S204, with respect to the base station. In order to do so, the user equipment may transmit a specific sequence to a preamble through a PRACH (Physical Random Access Channel) (S203), and may receive a response message respective to the random access through the PDCCH and its corresponding PDSCH (S204). In case of a contention based random access excluding the case of a Handover, a Contention Resolution Procedure, such as a PRACH transmission (S205) and a PDCCH/PDSCH reception (S206) may be additionally performed.

After performing the above-described process steps, the user equipment may perform PDCCH/PDSCH reception (S207) and PUSCH (Physical Uplink Shared Channel)/PUCCH (Physical Uplink Control Channel) transmission (S208), as general uplink/downlink signal transmission procedures. At this point, the control information, which is transmitted by the user equipment to the base station or received by the user equipment from the base station via uplink, may include downlink/uplink ACK/NACK signals, a CQI (Channel Quality Indicator, hereinafter referred to as 'CQI')/PMI (Precoding Matrix Index, hereinafter referred to as 'PMI')/RI (Rank Indicator, hereinafter referred to as 'RI'), and so on. In case of the 3GPP LTE (3rd Generation Partnership Project Long Term Evolution) system, the user equipment may transmit control information, such as the above-described CQI, PMI, RI, and so on, through the PUSCH and/or the PUCCH.

When the term base station, which is used in the description of the present invention, is used as a regional concept, the term base station may also be referred to as a cell or a sector. A serving base station (or cell) may be viewed as a base station (or cell) providing main services to the user equipment, and the serving base station (or cell) may also perform transmission and/or reception of control information over a coordinated multiple transmission point. Accordingly, the serving base station (or cell) may also be referred to as an anchor base station (or cell). The serving base station may transmit diverse information, which the service base station has received from the user equipment to a neighboring base station (cell). Similarly, when used as a regional concept, the term neighboring base station may also be referred to as a neighboring cell.

When the CoMP method is used under a multiple cell environment, the communication performance of a cell boundary user equipment may be enhanced. Such CoMP method may include a JP (Joint Processing) method of a coordinated MIMO format via data sharing and a CS/CB (Coordinated Scheduling/Beamforming) method for reducing inter-cell interference, such as a worst companion and a best companion. Herein, the worst companion method corresponds to a method wherein, by having the user equipment report a PMI, which causes the greatest interference among the cells performing CoMP, to the serving base station, the corresponding cells may remove (or eliminate) inter-cell interference by using a second-best PMI excluding the corresponding (or reported) PMI. And, the best companion method corresponds to a method wherein, by having the user equipment report a PMI, which causes the least interference among the cells performing CoMP, to the serving base station, the corresponding cells may remove (or eliminate) inter-cell interference by using the corresponding (or reported) PMI.

A cell boundary user equipment, which performs CoMP operations, is required to transmit feedback information having a common format (e.g., a common CQI format for all CoMP methods), which allows the user equipment to easily perform all CoMP operations (e.g., JP method, CS/CB method), to the serving base station. By transmitting the feedback information having the common format, diverse CoMP methods may be efficiently performed without having to perform complex signaling. Most particularly, in order to support such CoMP methods, measurement of CQI values among multiple cells and feedback of such measured values act as important factors.

The user equipment, which performs CoMP operations, is required to measure adequate CQI values respective not only to the serving base station, which performs the CoMP operations, but also to neighboring cells providing interference or desirable signals, and also required to feed-back such measured values to the serving base station. The base stations sharing the same feedback information should be capable of performing all CoMP operations. In order to do so, the user equipment may additionally transmit a CQI value of a serving cell, which performs feedback in a single cell operation, and transmit CQI values of the neighboring cells.

The CQI value of the serving cell, which performs feedback in a single cell operation, may be expressed by using Equation 1 shown below.

$$CQI_A = Q_A = \frac{S_A}{N + \overline{S_B} + \overline{S_C}} = \frac{S_A}{V} \quad \text{Equation 1}$$

Herein, $CQI_A$ corresponds to a CQI value of Cell A, being the serving cell, and $S_A$ indicates a power level (or interference level) of a signal received from a neighboring Cell A, which performs CoMP operations, $\overline{N}$ indicates a time average value of noise and interference power level measured from a cell that does not perform CoMP operations, $\overline{S_B}$ indicates a power level (or interference level) received from a neighboring Cell B, which performs CoMP operations, $\overline{S_C}$ indicates a power level (or interference level) received from a neighboring Cell C, which performs CoMP operations. V indicates a time average value of noise and interference power level measured from all of the remaining cells excluding the serving cell by using a $$\overline{N} + \overline{S_B} + \overline{S_C}$$

value.

In order to allow the cells performing the CoMP operations to easily perform both the CS/CB method and the JP method, the user equipment is required to transmit CQI information on the neighboring cells that perform the CoMP operations (which may be referred to as 'CoMP neighboring cells' for short) to the serving base station. The user equipment may generate a CQI value respective to a CoMP neighboring cell by using a denominator value of the CQI value respective to the serving cell (i.e., time average value of the sum of noise and interference power levels measured from all of the remaining cells excluding the serving cell and by also using received power level (or interference level) values of each CoMP neighboring cell, which is measured by using a reference signal received from each neighboring cell. Such CQI value of each CoMP neighboring cell, which is generated as described above, may be expressed by using Equation 2 and Equation 3 shown below.

$$CQI_B = Q_B = \frac{S_B}{N + \overline{S_B} + \overline{S_C}} = \frac{S_B}{V} \quad \text{Equation 2}$$

$$CQI_C = Q_C = \frac{S_C}{N + \overline{S_B} + \overline{S_C}} = \frac{S_C}{V} \quad \text{Equation 3}$$

Herein, $S_B$ indicates a power level (or interference level) of a signal received from a neighboring Cell B, which performs CoMP operations, and $S_C$ indicates a power level (or interference level) of a signal received from a neighboring Cell C, which performs CoMP operations.

The intensity or interference level of a signal measured by the user equipment from a neighboring cell may be expressed in diverse formats, such as SINR (Signal to Interference plus Noise Ratio), CINR (Carrier to Interference plus Noise Ratio), RSRP (Reference Signal Received Power), RSRQ (Reference Signal Received Quality), and so on. For example, among the CoMP operation methods, when the user equipment performs Joint Processing, the user equipment may use reference signals received from cells performing Joint Processing so as to measure the intensity of the received signals.

Figure 3:
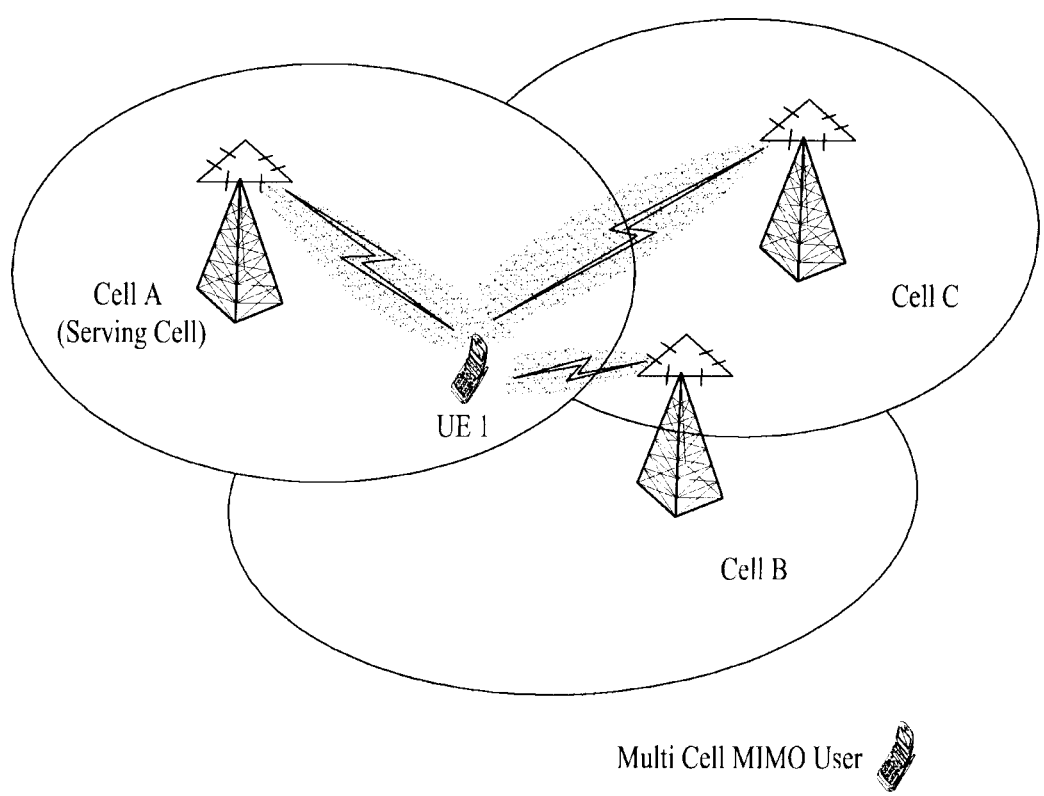
FIG. 3 illustrates a conceptual view of a method for performing CoMP operations according to the present invention.

FIG. 3 illustrates a conceptual view of a method for performing CoMP operations according to the present invention.

Referring to FIG. 3, it will be assumed that Cells A, B, and C are performing CoMP on a user equipment (UE 1), which belongs to (or is located at) the boundary (or edge) of Cell A. The user equipment belonging to the Serving Cell A may transmit common feedback information for supporting all available CoMP methods to the serving base station. Most particularly, in case of the CQI value, the value respective to the CoMP neighboring cell may be generated in the above-described format, so as to be fed-back. After receiving such feedback information, in order to perform the Coordinated Beamforming (CB) method or the Joint Processing (JP) method, the base station may calculate each CQI value based upon the received feedback information. If the cells performing the CoMP operations use the Coordinated Beamforming (CB) method, among the diverse CoMP methods, the CQI value, which may be expressed by using Equation 4 shown below, may be generated.

$$\frac{S_A}{V - \overline{S_B} - \overline{S_C}} =$$

$$\frac{S_A}{V - Q_B \cdot V - Q_C \cdot V} = \frac{S_A}{V} \cdot \frac{1}{1 - Q_B - Q_C} = \frac{Q_A}{1 - Q_B - Q_C} \quad \text{Equation 4}$$

Equation 4 shown above indicates a CQI value corresponding to a case where the Coordinated Beamforming (CB) method is applied with respect to the serving Cell A. As expressed in Equation 4, the CQI value respective to the case where the base station uses the Coordinated Beamforming (CB) method, may be obtained by directly using the CQI value respective to the cell performing the CoMP operations, which is received from the user equipment, without any modifications. More specifically, the CQI value of the Coordinated Beamforming (CB) method may be expressed as $$\frac{Q_A}{1 - Q_B - Q_C}$$

by using $CQI_A$ (=$Q_A$), $CQI_B$ (=$Q_B$), and $CQI_C$ (=$Q_C$), which correspond to CQI values respective to cells performing the CoMP operations.

If the cells performing the CoMP operations use the Joint Processing (JP) method, among the diverse CoMP operations, the CQI value may be generated by using Equation 5 shown below.

$$\left(\frac{\sqrt{S_A}+\sqrt{S_B}+\sqrt{S_C}}{\sqrt{V-S_B-S_C}}\right)^2 = \left(\frac{\sqrt{Q_A \cdot V}+\sqrt{Q_B \cdot V}+\sqrt{Q_C \cdot V}}{\sqrt{V-Q_B \cdot V-Q_C \cdot V}}\right)^2 = \left(\frac{\sqrt{Q_A}+\sqrt{Q_B}+\sqrt{Q_C}}{\sqrt{1-Q_B-Q_C}}\right)^2$$

Equation 5

As shown in Equation 5, the CQI value respective to the case when the base station uses the Joint Processing (JP) method, may be obtained by directly using the CQI value respective to the cell performing the CoMP operations, which is received from the user equipment, without any modifications. More specifically, the CQI value of the Coordinated Beamforming (CB) method may be expressed as $$\left(\frac{\sqrt{Q_A}+\sqrt{Q_B}+\sqrt{Q_C}}{\sqrt{1-Q_B-Q_C}}\right)^2$$

by using $CQI_A$ (=$Q_A$), $CQI_B$ (=$Q_B$), and $CQI_C$ (=$Q_C$), which correspond to CQI values respective to cells performing the CoMP operations.

As described above, when the Coordinated Beamforming (CB) method is operated, among the CoMP operations, the CQI value may be generated by using Equation 4. And, when the Joint Processing method is operated, among the CoMP operations, the CQI value may be generated by using Equation 5. Furthermore, in case the CoMP method that is to be operated between the user equipment and the cells is yet to be decided, it is advantageous in that the base station may generate the CQI values respective to both the Coordinated Beamforming (CB) method and the Joint Processing method, which are expressed in Equation 4 and Equation 5. As described above, when generating the CQI values for both CoMP methods, it is advantageous in that the base station can easily perform dynamic switching with respect to the CoMP method.

As described above, the CQI value for the Coordinated Beamforming (CB) method or the Joint Processing method may be easily deduced from the $CQI_A$ (=$Q_A$), $CQI_B$ (=$Q_B$), and $CQI_C$ (=$Q_C$) values, which are transmitted from the user equipment. Accordingly, common feedback of the user equipment may be available. Furthermore, in transmitting the CQI value of a neighboring cell to the CQI value of the serving cell based upon the conventional single cell operations, since an average interference level value is being used, measurement values that are defined in the conventional LTE system may be used. Therefore, it is advantageous in that a new measurement value is not required to be defined herein.

Figure 4:
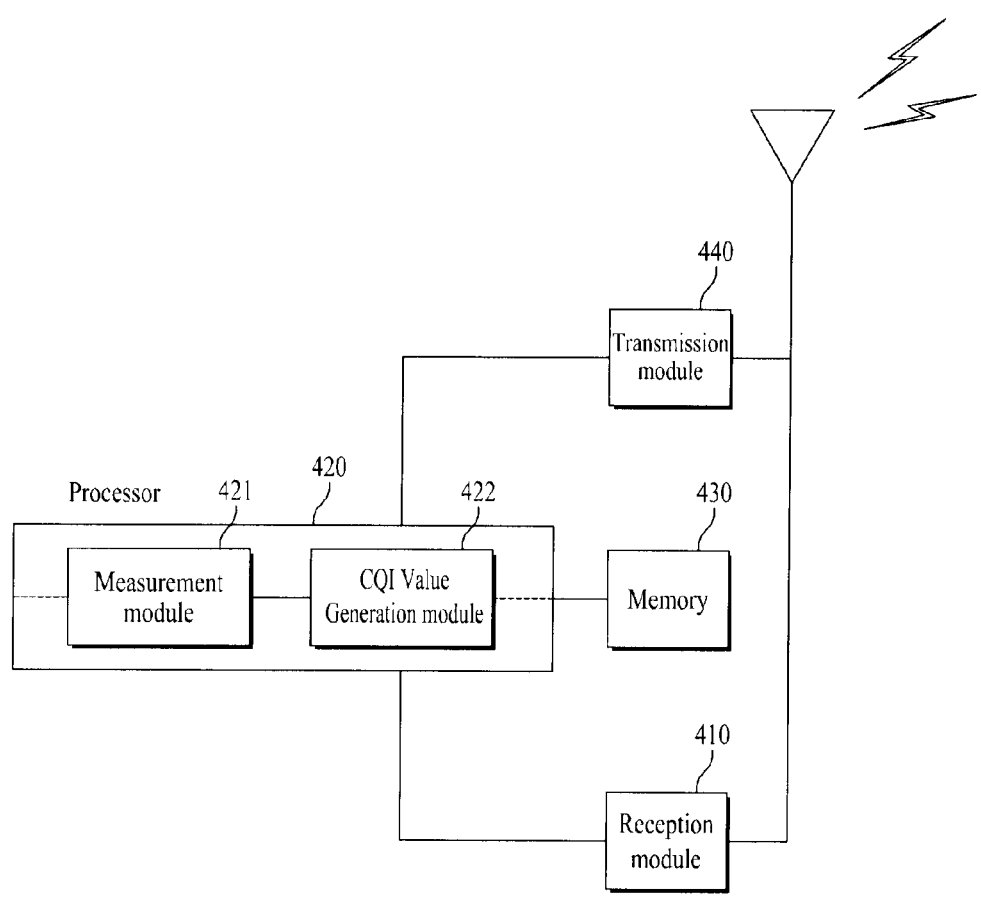
FIG. 4 illustrates a structure of a user equipment device according to a preferred embodiment of the present invention.

FIG. 4 illustrates a structure of a user equipment device according to a preferred embodiment of the present invention.

Referring to FIG. 4, the user equipment device according to the present invention is provided with a reception module (410), a processor (420), a memory unit (430), and a transmission module (440).

The reception module (410) may receive reference signals from at least one or more cells existing within the radio network. The processor (420) is provided with a measurement module (421) and a CQI value generation module (422).

The measurement module (421) may measure the intensity or interference level of the signal corresponding to each cell by using the reference signal received by the reception module (410) from each of the at least one or more cells performing the CoMP operations. Also, the measurement module (421) may measure the intensity or interference level of the signal corresponding to each cell by using the reference signal received from each cell performing the CoMP operations. Furthermore, the measurement module (421) may measure a sum of signal intensity or a sum of interference levels of the remaining neighboring cells excluding the serving cell, among the cell that are performing CoMP operation, and the cells that do not perform the CoMP operations. Among the measured intensity or interference level values of the signal corresponding to each cell performing the CoMP operations, the CQI value generation module (422) may use an average value calculated from intensity or interference level values of the signal corresponding to each cell performing the CoMP operations and from a sum of signal intensity or a sum of interference level values of the signal corresponding to each cell that does not perform the CoMP operations, the values being accumulated for a predetermined time period, so as to generate channel quality information for each cell performing the CoMP operations.

The memory unit (430) may store the values measured by the measurement module (422) and the CQI values generated from the CQI value generation module for a predetermined period of time. The memory unit (430) may also be replaced with another element, such as a buffer (not shown). The transmission module (440) may transmit the generated CQI value to the serving base station.

Figure 5:
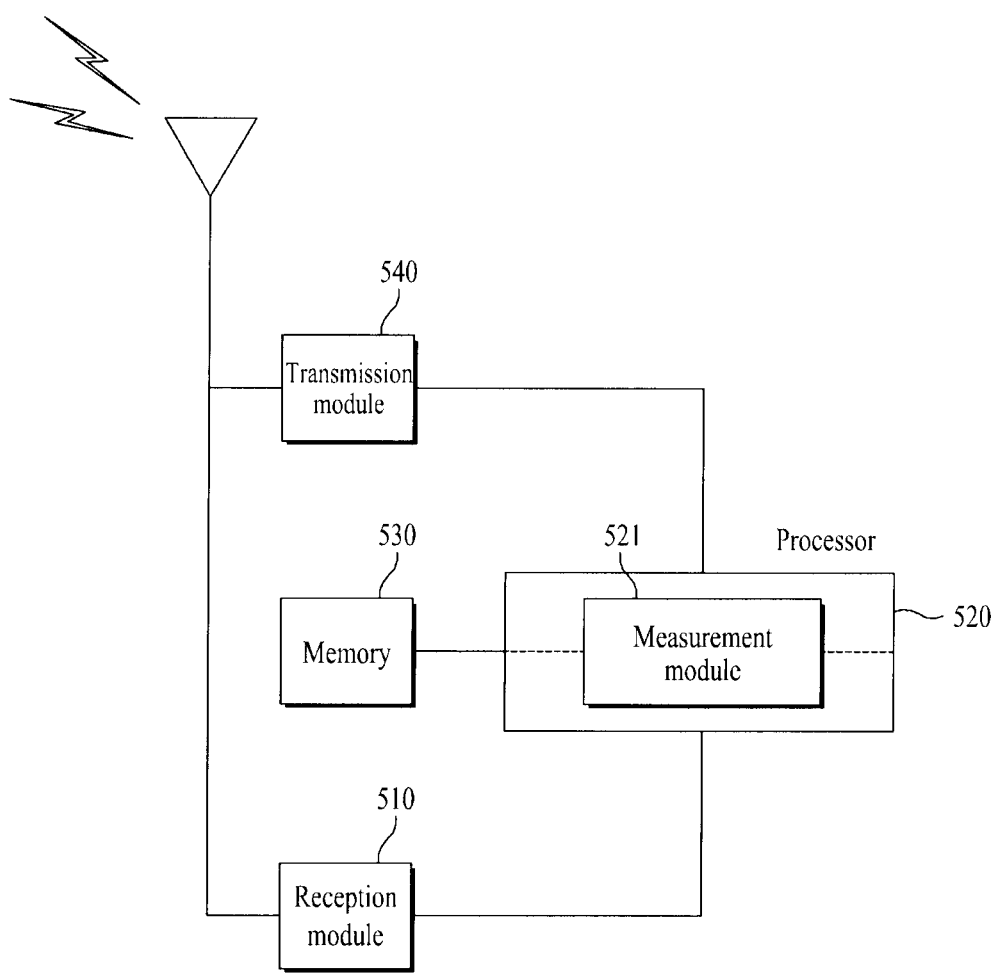
FIG. 5 illustrates a structure of a base station device according to a preferred embodiment of the present invention.

FIG. 5 illustrates a structure of a base station device according to a preferred embodiment of the present invention.

Referring to FIG. 5, the user equipment device according to the present invention is provided with a reception module (510), a processor (520), a memory unit (530), and a transmission module (540).

The reception module (510) may receive channel quality information values respective to each cell performing the CoMP operations from the user equipment. At this point, the reception module (510) may receive channel quality information values respective to each cell performing the CoMP operations from another base station or user equipment.

The processor (520) is provided with a CQI value generation module (521). The CQI value generation module (521) may generate CQI values corresponding to a specific CoMP operation scheme by using the channel quality information values respective to each cell performing CoMP operations, the channel quality information values being received by the reception module (510). The CQI value generation module (521) may generate at least one channel quality information value, among the channel quality information value corresponding to a first CoMP operation scheme and the channel quality information value corresponding to a second CoMP operation method. At this point, the channel quality information value received by the base station device from the user equipment may be generated by using an average value calculated from intensity or interference level values of the signal corresponding to each cell performing the CoMP operations and from a sum of signal intensity or a sum of interference level values of the signal corresponding to each cell that does not perform the measured CoMP operations, the values being accumulated for a predetermined period of time.

Furthermore, the first CoMP operation scheme may correspond to the Coordinated Beamforming method, and the second CoMP operation scheme may correspond to the Joint Processing method.

The memory unit (530) may store the CQI values received by the reception module (510) and the CQI values generated from the CQI value generation module (521) for a predetermined period of time. The memory unit (530) may also be replaced with another element, such as a buffer (not shown).

The transmission module (540) may transmit the CQI values generated by the CQI value generation module (521) to another base station or user equipment.

As described above, a detailed description of the preferred embodiments of the present invention disclosed herein is provided so that anyone skilled in the art can be capable of realizing and performing the present invention. It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention. For example, anyone skilled in the art may apply the exemplary embodiments presented herein by combining each structure disclosed in the description of the present invention.

Therefore, the present invention will not be limited only to the exemplary embodiments disclosed herein. Instead, the present invention seeks to provide a broader scope of the present invention best fitting the disclosed principles and new characteristics of the invention described herein.

INDUSTRIAL APPLICABILITY

The method for transmitting CoMP feedback information, and a user equipment device and a base station device both using the same may be industrially applied to communication systems, such as 3GPP LTE, LTE-A, and IEEE 802 systems.

What is claimed is:

1. A method of transmitting CoMP feedback information at a user equipment (UE) performing CoMP (Coordinated Multi-Point) operations in a wireless communication system, the method comprising:
   measuring a signal intensity of a serving cell and one or more neighboring cells among CoMP cells performing the CoMP operations for the UE by using a reference signal received from the CoMP cells;
   measuring interference from one or more non-CoMP cells that do not perform the CoMP operations for the UE;
   generating a first channel quality information (CQI) regarding the serving cell and a second CQI regarding the neighboring cells among the CoMP cells based on the measured signal intensity and interference; and
   transmitting the generated first and second channel quality information to the serving cell,
   wherein the first CQI is generated based on the signal intensity of the serving cell and a time-average of the signal intensity of the neighboring cells among the CoMP cells plus the interference from the non-CoMP cells, and
   the second CQI is generated based on the signal intensity of the neighboring cells and the time-average of the signal intensity of the neighboring cells among the CoMP cells plus the interference from the non-CoMP cells.

2. The method of claim 1, wherein the signal intensity or the interference is expressed as any one of SINR (Signal to Interference plus Noise Ratio), CINR (Carrier to Interference plus Noise Ratio), RSRP (Reference Signal Received Power), and RSRQ (Reference Signal Received Quality).

3. The method of claim 1, wherein the first and the second channel quality information is expressed as Equation A shown below:

$$CQI_i = \frac{S_i}{V}, \quad \text{[Equation A]}$$

where $S_i$ indicates signal intensity of cell i, cell i performing the CoMP operations, V indicates a time-averaged value of a sum of noise and interference from the non-CoMP cells and the CoMP cells excluding the serving cell.

4. A user equipment (UE) apparatus for transmitting CoMP feedback information in order to perform CoMP (Coordinated Multi-Point) operations in a wireless communication system, the user equipment apparatus comprises:
   a measurement module configured to measure a signal intensity of a serving cell and one or more neighboring cells among CoMP cells performing the CoMP operations for the UE, by using a reference signal received from the CoMP cells and to measure interference from one or more non-CoMP cells that do not perform the CoMP operations for the UE;
   a generation module configured to generate first channel quality information (CQI) regarding the serving cell and second channel quality information (CQI) regarding the neighboring cells, based on the measured signal intensity and the interference; and
   a transmission module configured to transmit the first and the second channel quality information to the serving cell,
   wherein the first CQI is generated based on the signal intensity of the serving cell and a time-average of the signal intensity of the neighboring cells among the CoMP cells plus the interference from the non-CoMP cells, and
   the second CQI is generated based on the signal intensity of the neighboring cells and the time-average of the signal intensity of the neighboring cells among the CoMP cells plus the interference from the non-CoMP cells.

5. The user equipment apparatus of claim 4, wherein the single intensity and the interference is expressed as any one of SINR (Signal to Interference plus Noise Ratio), CINR (Carrier to Interference plus Noise Ratio), RSRP (Reference Signal Received Power), and RSRQ (Reference Signal Received Quality).

6. The user equipment apparatus of claim 4, wherein the first and the second channel quality information is expressed as Equation A shown below:

$$CQI_i = \frac{S_i}{V}, \quad \text{[Equation A]}$$

where $S_i$ indicates intensity of a signal received from cell i, cell i performing the CoMP operations, V indicates an average value of a sum of noise and interference power levels measured from the remaining cells excluding the serving cell, the average value of the sum being accumulated for a predetermined time period.

7. A method of generating Channel Quality Information values at a base station (BS) performing CoMP (Coordinated Multi-Point) operations in a wireless communication system, comprising:
receiving a channel quality information value respective to each cell performing the CoMP operations from a user equipment (UE); and
generating at least one channel quality information value, among a channel quality information value corresponding to a first CoMP operation scheme and a channel quality information value corresponding to a second CoMP operation scheme, by using the received channel quality information value respective to each cell,
wherein the received channel quality information is generated by using the measured intensity or interference levels values of the signals corresponding to each cell performing the CoMP operations and an average value of a sum of the signal intensity or interference level values of each cell that does not perform the CoMP operations, the average value of the sum being accumulated for a predetermined time period,
wherein, among the generated channel quality information values, the channel quality information value corresponding to the first CoMP operation scheme, the first CoMP operation scheme being operated by using a Coordinated Beamforming scheme, is expressed by using Equation B shown below:

$$CQI = \frac{Q_A}{1 - Q_B - Q_C},\quad \text{[Equation B]}$$

where A indicates a serving cell performing CoMP operations, B and C respectively indicate neighboring cells performing the CoMP operations, and where $Q_A$, $Q_B$, and $Q_C$ respectively indicate channel quality information values of serving cell A, neighboring cell B, and neighboring cell C that perform the CoMP operations,
wherein the $Q_A$, $Q_B$, and $Q_C$ are transmitted from the user equipment.

8. The method of claim 7, wherein, among the generated channel quality information values, the channel quality information value corresponding to the second CoMP operation method, the second CoMP operation scheme being operated by using a Joint Processing scheme, is expressed by using Equation C shown below:

$$CQI = \left(\frac{\sqrt{Q_A} + \sqrt{Q_B} + \sqrt{Q_C}}{\sqrt{1 - Q_B - Q_C}}\right)^2.\quad \text{[Equation C]}$$

9. A base station (BS) apparatus performing CoMP (Coordinated Multi-Point) operations for generating Channel Quality Information values in a wireless communication system, the base station apparatus comprises:
a reception module configured to receive a channel quality information value respective to each cell performing the CoMP operations from a user equipment; and
a generation module configured to generate at least one channel quality information value, among a channel quality information value corresponding to a first CoMP operation scheme and a channel quality information value corresponding to a second CoMP operation scheme, by using the received channel quality information value respective to each cell,
wherein the received channel quality information is generated by using the measured intensity or interference level values of the signals corresponding to each cell performing the CoMP operations, an average value of a sum of the signal intensity or interference level values of each cell that does not perform the CoMP operations, the average value of the sum being accumulated for a predetermined time period,
wherein, among the generated channel quality information values, the channel quality information value corresponding to the first CoMP operation scheme, the first CoMP operation scheme being operated by using a Coordinated Beamforming method, is expressed by using Equation D shown below:

$$CQI = \frac{Q_A}{1 - Q_B - Q_C},\quad \text{[Equation D]}$$

where A indicates a serving cell performing CoMP operations, B and C respectively indicate neighboring cells performing the CoMP operations, and where $Q_A$, $Q_B$, and $Q_C$ respectively indicate channel quality information values of serving cell A, neighboring cell B, and neighboring cell C, each cell performing the CoMP operations,
wherein the $Q_A$, $Q_B$, and $Q_C$ are transmitted from the user equipment.

10. The base station apparatus of claim 9, wherein, among the generated channel quality information values, the channel quality information value corresponding to the second CoMP operation scheme, the second CoMP operation scheme being operated by using a Joint Processing scheme, is expressed by using Equation E shown below:

$$CQI = \left(\frac{\sqrt{Q_A} + \sqrt{Q_B} + \sqrt{Q_C}}{\sqrt{1 - Q_B - Q_C}}\right)^2.\quad \text{[Equation E]}$$

* * * * *